US007213576B2

(12) United States Patent
Furugen

(10) Patent No.: US 7,213,576 B2
(45) Date of Patent: May 8, 2007

(54) HIGH PRESSURE FUEL INJECTION TUBE AND METHOD OF FORMING THE SAME

(75) Inventor: Munekatsu Furugen, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 70 days.

(21) Appl. No.: 11/217,866

(22) Filed: Sep. 1, 2005

(65) Prior Publication Data

US 2006/0042710 A1 Mar. 2, 2006

(30) Foreign Application Priority Data

Sep. 2, 2004 (JP) ............................ 2004-256052

(51) Int. Cl.
*F16L 9/00* (2006.01)

(52) U.S. Cl. ....................... 123/468; 138/109; 285/386

(58) Field of Classification Search ................ 123/468, 123/469; 138/109; 72/370.11; 285/386
See application file for complete search history.

(56) References Cited

U.S. PATENT DOCUMENTS 4,881,763 A * 11/1989 Guido et al. ................ 285/382
5,402,829 A * 4/1995 Takikawa et al. ........... 138/109
5,617,828 A * 4/1997 Kuegel et al. .............. 123/468
5,667,255 A * 9/1997 Kato ....................... 285/133.4
6,279,540 B1 * 8/2001 Greaney et al. ............ 123/470
6,415,768 B1 * 7/2002 Usui .......................... 123/468
6,431,150 B1 * 8/2002 Pearlman et al. ........... 123/468
6,536,806 B1 * 3/2003 Uematsu et al. .............. 285/55
6,595,558 B2 7/2003 Kusanagi
6,824,173 B2 11/2004 Usui
6,840,283 B2 1/2005 Furugen et al.
6,843,275 B2 1/2005 Kato
6,871,638 B2 * 3/2005 Kondo ....................... 123/469
6,918,378 B2 * 7/2005 Usui et al. .................. 123/468
6,935,377 B2 * 8/2005 Furugen ..................... 138/109
6,938,880 B2 * 9/2005 Enke et al. ................. 251/362
2001/0003398 A1 * 6/2001 Usui .......................... 285/405

FOREIGN PATENT DOCUMENTS

JP 8-75075 3/1996
JP 2003336560 11/2003

* cited by examiner

*Primary Examiner*—Thomas Moulis
(74) *Attorney, Agent, or Firm*—Gerald E. Hespos; Anthony J. Casella

(57) ABSTRACT

A high pressure fuel injection tube includes a connection head with a seat face in a spherical shape. A ring-like flange is spaced from the seat face in an axial direction. A conical portion is formed in the interval between the ring-like flange and the seat face. An undercut bent recess groove with a ring-like shape and a deep depth is formed on the conical portion. Thus, a shallow smooth ring-like recess groove is formed on an inner side of the connection head, and a compressive residual stress is present at an inner peripheral face of the ring-like groove.

8 Claims, 6 Drawing Sheets

HIGH PRESSURE FUEL INJECTION TUBE AND METHOD OF FORMING THE SAME

BACKGROUND OF THE INVENTION

1. Field of the Invention

The present invention relates to a high pressure fuel injection tube used widely in, for example, a supply path or the like of fuel in a diesel internal combustion engine and having a connection head portion by a thick-walled steel tube of a comparatively slender diameter having a tube diameter of 4 mm through 20 mm and a wall thickness of about 1 mm through 8 mm and a method of forming the same.

2. Description of Related Art

There is known a high pressure fuel injection tube of this kind of a background art arranged to be used in a supply path of fuel of a diesel internal combustion engine or the like having a connection head portion 22 formed by a seat face 23 in a spherical shape, a ring-like flange portion 25 formed to be arranged to be spaced apart from the seat face 23 in an axis core direction at an interval therebetween and a conical portion 24 formed conversingly in a direction of the seat face 23 at an interval region reaching the ring-like flange portion 25 continuously from the seat face 23 at a connection end portion of a thick-walled steel tube 21 having a comparatively slender diameter as shown by, for example, FIG. 7 (refer to JP-A-8-75075).

It is general that the connection head portion 22 of this kind is constituted to produce a deep, sharp, and large ring-like pocket 26 at an inner peripheral face of the head portion by spreading a peripheral wall to an outer side in accordance with buckling in relation to forming by the buckling by being pressed in the axis core direction by a punching member from outside and is subjected to use under such a state.

However, the high pressure fuel injection tube having such a connection head portion poses a problem that cavitation erosion is brought about at the pocket portion owing to a high pressure fluid in being arranged to be used by the deep, sharp and large thin-like pocket 26 formed at an inner peripheral face of the connection head portion 22 and a problem that there is the threat of possibility of constituting an onset of fatigue rupture by the deepest portion of the pocket portion.

In order to resolve such a problem, the applicant has previously proposed a high pressure fuel injection tube having a connection head portion capable of eliminating a concern by cavitation erosion and the threat of fatigue rupture on an inner side of the head portion by forming a ring-like pocket produced at inside of the head portion with by working the connection head portion into a contour shape of a section as shallow and smooth as possible (refer to JP-A-2003-336560).

According to the high pressure fuel injection tube, as shown by FIG. 8, in the high pressure fuel injection tube having a connection head portion 32 constituted by a seat face 33 in a spherical shape, a ring-like flange portion 35 formed to be arranged to be spaced apart from the seat face in an axis core direction at an interval therebetween and a conical portion 34 formed conversingly in a direction of the seat face at an interval region reaching the ring-like flange portion 35 continuously from the seat face 33 at a connection end portion of a thick-walled steel tube 31 having a comparatively slender diameter, a ring-like recess groove (pocket) 36 formed at an inner peripheral face of the connection head portion in accordance with forming the connection head portion 32 is formed into a contour shape having a shallow smooth section by providing a bent recess groove 34-1 in a ring-like shape having a shallow depth at a portion of the conical portion 34.

That is, according to the high pressure fuel injection tube, a portion of conical face of the connection head portion is pinched by exerting more pressure, by operation of pressing a projected bent face corresponding to the contour shape of the bent recess groove 34-1 previously provided on the side of a forming punch, the bent recess groove 34-1 in the ring-like shape having the shallow depth at a portion of the conical portion 34 of the connection head is formed, thereby the depth of the ring-like recess groove at the inner peripheral face of the connection head produced by buckling can be made to be shallow and smooth, cavitation erosion by a hydraulic pressure at the ring-like recess groove at the inner peripheral face of the connection head portion is prevented from being brought about and the threat of a possibility of constituting an onset of fatigue rupture by stress concentration is reduced.

Although according to the high pressure fuel injection tube previously proposed by the applicant, by providing the ring-like recess groove having the shallow depth at a portion of the conical portion of the connection head portion, the depth of the ring-like recess groove (pocket) on the inner side of the connection head portion produced by buckling is made to be shallow and smooth, thereby, there is achieved an excellent effect of eliminating the concern of cavitation erosion by the hydraulic pressure at inside of the connection head portion and capable of reducing the threat of the possibility of constituting the onset of the fatigue rupture, since there is hardly present a compressive residual stress extremely effective in increasing a strength against the fatigue rupture at the ring-like recess groove portion on the inner side of the connection head portion, there poses a problem that the strength against the fatigue rupture at the ring-like recess groove portion is not sufficiently achieved.

That is, by only making the ring-like recess groove (pocket) on the inner side of the connection head portion produced by buckling shallow and smooth by providing the ring-like recess groove having the shallow depth at a portion of the conical portion of the connection head portion, since the depth of the ring-like recess groove provided at an outer peripheral face of the conical portion of the connection head portion is shallow, the connection head portion after buckling is brought into a tensile residual stress state, and there is brought about a state in which the compressive residual stress extremely effective in increasing the strength against the fatigue rupture is hardly present at the ring-like recess groove (pocket) on the inner side of the connection head portion.

SUMMARY OF THE INVENTION

The invention has been carried out in order to resolve the above-described problem and it is an object thereof to provide a high pressure fuel injection tube not only capable of preventing cavitation erosion by a hydraulic pressure from being brought about at an inner peripheral face of a connection head portion but also excellent in a strength against fatigue rupture and a method of forming the same.

A high pressure fuel injection tube according to the invention includes a connection head portion comprising a seat face in a spherical shape, a ring-like flange portion arranged to be formed to be spaced apart from the seat face at an interval therebetween in an axis core direction, and a conical portion conversingly formed in a direction of the seat face at the interval region reaching a position of the ring-like flange portion continuously from the seat face at a connection end portion of a thick-walled steel tube having a comparatively slender diameter, wherein by providing an undercut bent recess groove in a ring-like shape having a deep depth at a portion of the conical portion, a ring-like recess groove on an inner side of the head portion produced in accordance with forming the connection head portion is formed into a contour shape of a section which is provided with a shallow depth and is smooth and a compressive residual stress is made to be present on an inner peripheral face of the ring-like recess groove portion.

Further, in the invention, the undercut bent recess groove in the ring-like shape having the deep depth satisfies conditions that W/L=0.3 through 0.75, DA/d=0.95 through 1.3 and a minimum outer diameter of the bent recess groove becomes smaller than DA when an end edge on a side of the ring-like flange portion of the bent groove is defined as a point A1, an end edge on an opposed side of the ring-like flange portion is defined as a point A2, an outer diameter of the steel tube is designated by a notation d, an outer diameter of the point A2 is designated by a notation DA, a distance in parallel with a tube axis between the point A1 and the point A2 (a width of the bent recess groove) is designated by a notation W and a distance between an end face of the seat face in the spherical shape and the point A1 is designated by a notation L.

Further, a method of forming the high pressure fuel injection tube includes: forming, on a connection end portion of a thick-walled steel tube having a comparatively slender diameter, a seat face in a spherical shape and a ring-like flange portion arranged to be formed to be spaced apart from the seat face at an interval therebetween in an axis core direction, and at the interval region reaching a position of the ring-like flange portion continuously from the seat face, a conical portion formed conversingly in a direction of the seat face, and then forming, on a portion of the conical portion, an undercut bent recess groove in a ring-like shape having a deep depth.

Furthermore, after forming a shallow bent recess groove in a ring-like shape on a portion of the conical portion, the method proceeds by forming said recess groove to an undercut bent recess groove having deep depth.

The above-mentioned method of forming the undercut bent recess groove in the ring-like shape having the deep depth at the portion of the conical portion in the forming method is characterized in using a method of forming the ring-like bent recess groove by rolling by a roller or by swaging by a plurality of pressing pieces each having a bent projected face in a shape of a circular arc, or a method of forming a bent projected streak in a ring-like shape at the portion of the conical portion in forming the conical portion, successively, forming the bent projected streak by rolling by a roller or swaging by a plurality of pressing pieces each having a bent projected face in a shape of a circular arc.

According to the high pressure fuel injection tube of the invention, by providing the undercut bent recess groove in the ring-like shape having the deep depth at a portion of the conical portion of the connection head portion, the ring-like recess groove produced on an inner side of the head portion produced in accordance with forming the connection head portion is formed into the contour shape of the section which is provided with a shallow depth and is smooth, a compressive residual stress is present at the inner peripheral face of the ring-like recess groove and therefore, there is achieved an excellent effect of not only capable of substantially completely eliminating a concern of cavitation erosion by the hydraulic pressure at the ring-like recess groove at the inner peripheral face of the connection head portion but also excellent in a fatigue rupture strength at the inner peripheral face of the ring-like recess groove portion by operation of the compressive residual stress and having an extremely small possibility of constituting an onset of fatigue rupture by the ring-like recess groove portion.

Further, according to the invention method, the portion of the conical portion of the connection head portion can comparatively easily be provided with the undercut bent recess groove in the ring-like shape having the deep depth at the portion of the conical portion of the connection head portion, the ring-like recess groove of the contour shape of the section which is provide with a shallow depth and is smooth can be formed at the inner peripheral face of the connection head portion, simultaneously, the compressive residual stress extremely effective in increasing the fatigue rupture strength can be provided to the inner peripheral face of the ring-like recess groove portion and therefore, the high pressure fuel injection tube having the connection head portion eliminating capitation erosion by the hydraulic pressure at the ring-like recess groove of the inner peripheral face of the connection head portion and excellent in the fatigue rupture strength can be fabricated at low cost.

DESCRIPTION OF PREFERRED EMBODIMENTS

Figure 1:
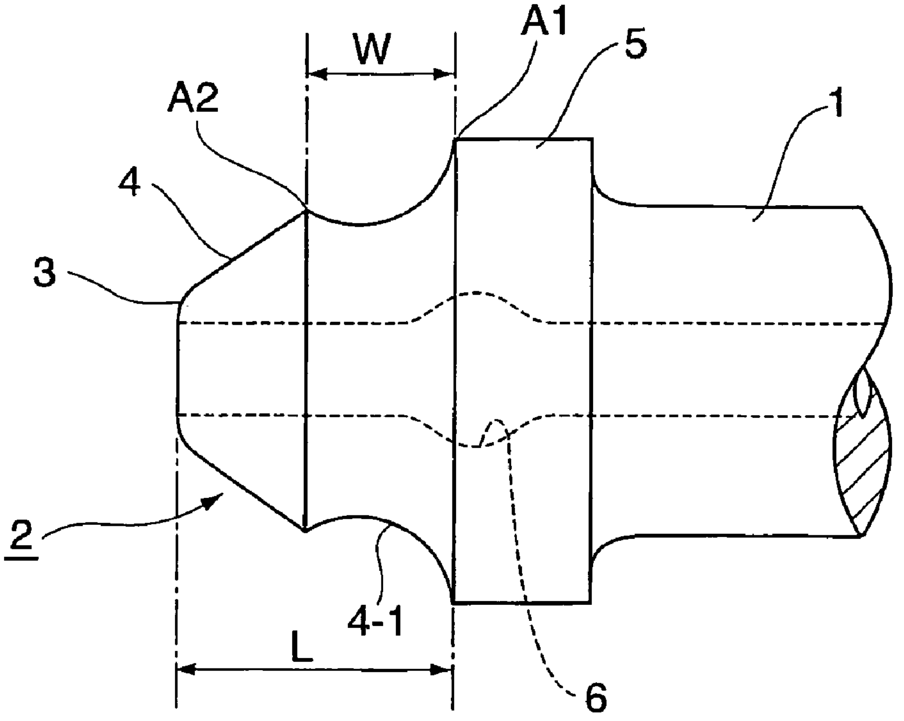
FIG. 1 is a side view showing an embodiment of a connection head portion of a high pressure fuel injection tube according to the invention.
Figure 2:
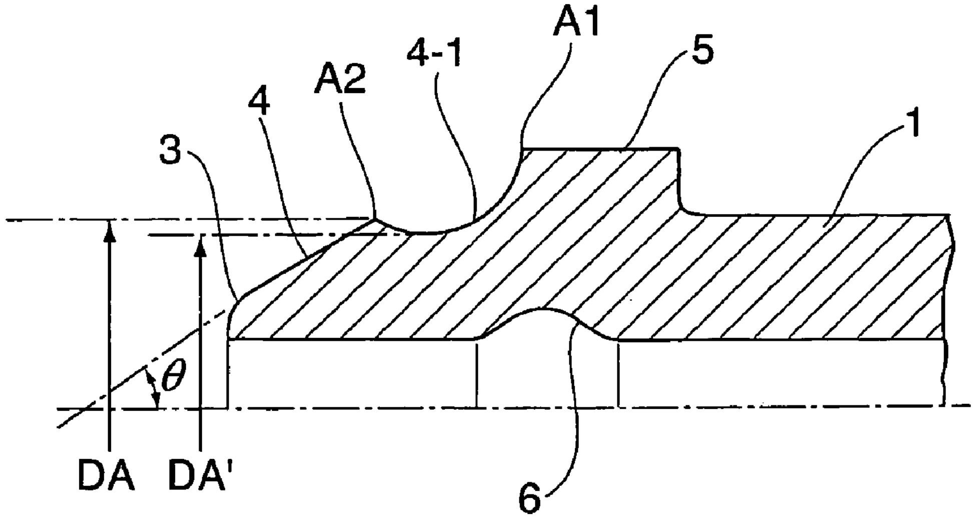
FIG. 2 is a half cut view of a section of FIG. 1.
Figure 3A:
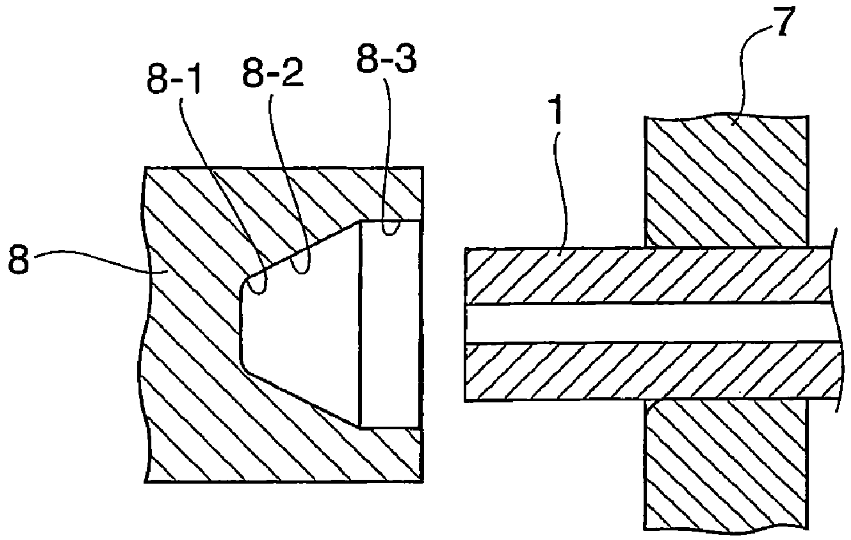
FIGS. 3A and 3B are explanatory views of a section showing a first embodiment of a connection head forming step of the high pressure fuel injection tube according to the invention.
Figure 3B:
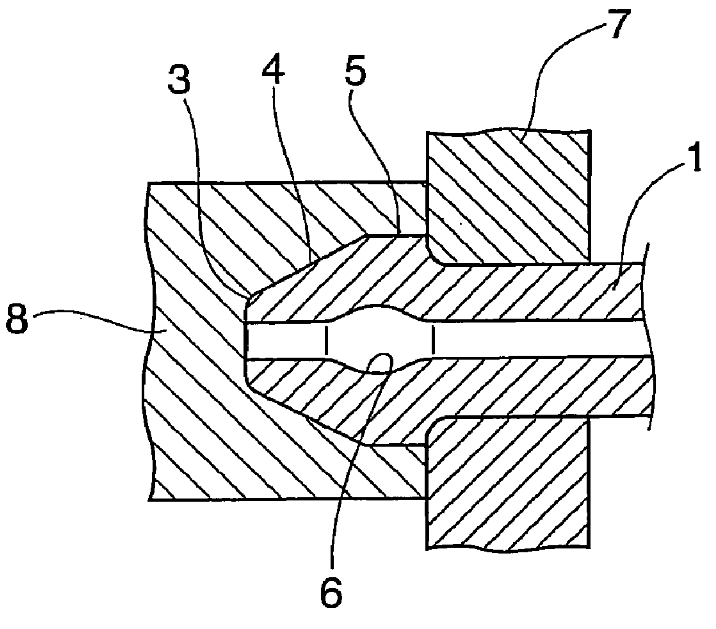
Figure 4A:
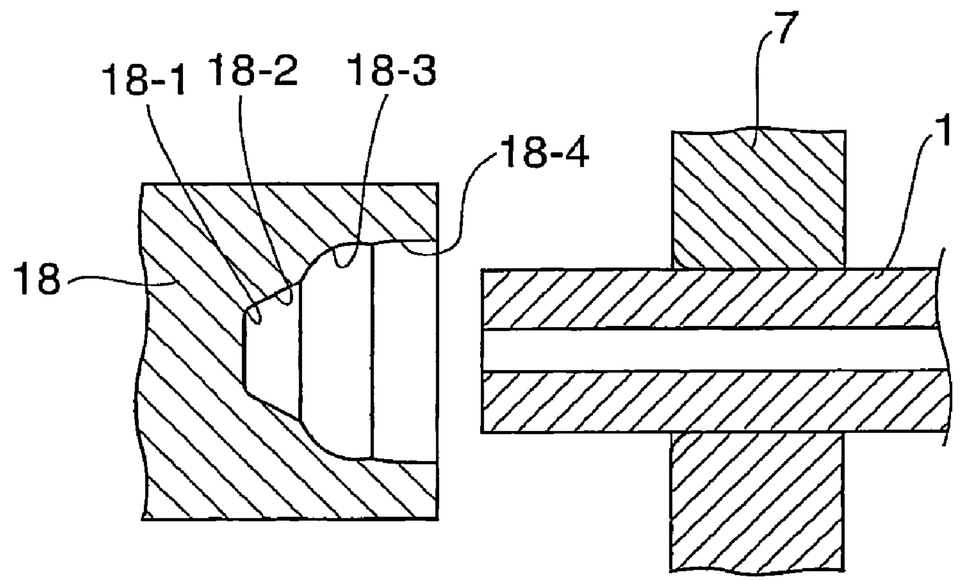
FIGS. 4A and 4B are explanatory views of a section similarly showing a second embodiment of the connection head portion forming step of the high pressure fuel injection tube.
Figure 4B:
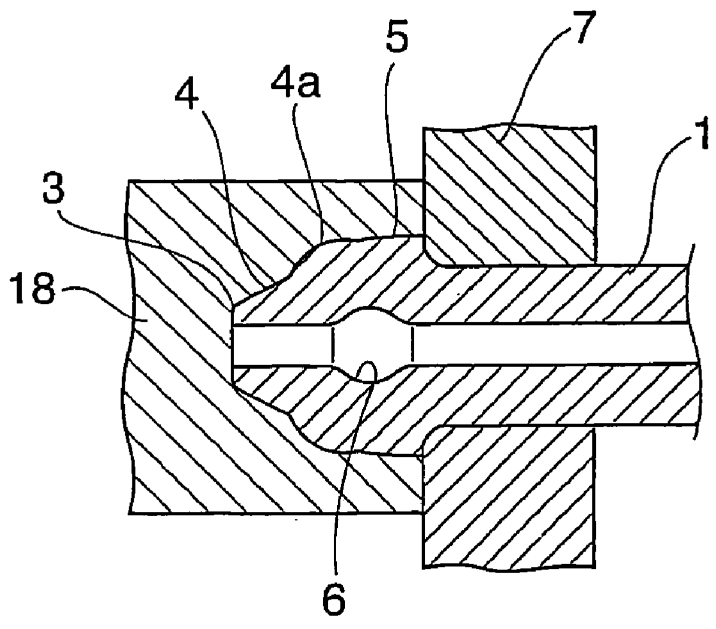
Figure 5:
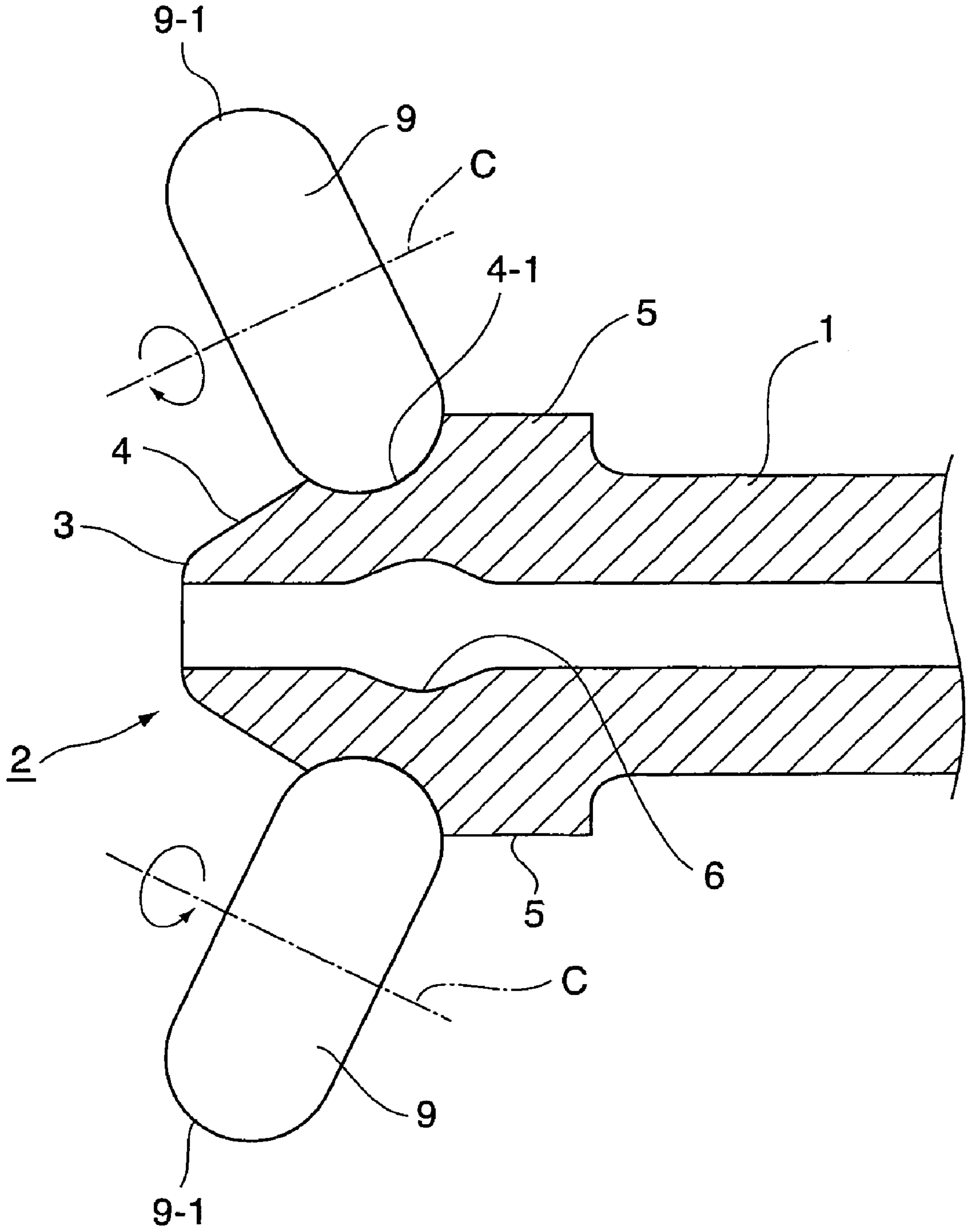
FIG. 5 is an explanatory view of a section showing a first embodiment of a step of forming an undercut bent recess groove of a ring-like shape having a deep depth and a ring-like recess groove of a contour shape of a section which is provided with a shallow depth and is smooth at the connection head portion of the high pressure fuel injection tube.
Figure 6:
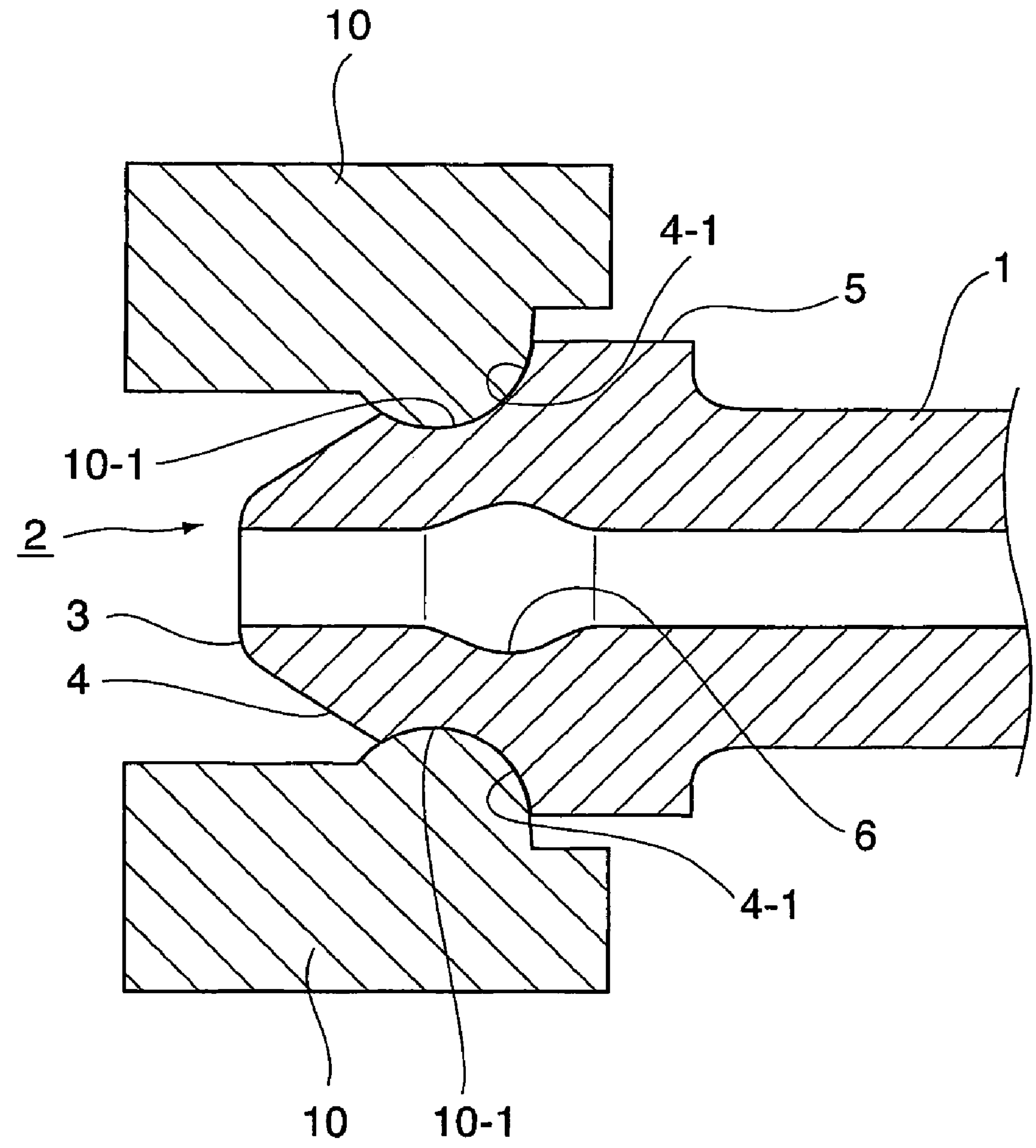
FIG. 6 is an explanatory view similarly showing a second embodiment of a step of forming an undercut bent recess groove of a ring-like shape having a deep depth and a ring-like recess groove (pocket) of a contour shape of a section which is provided with a shallow depth and is smooth.
Figure 7:
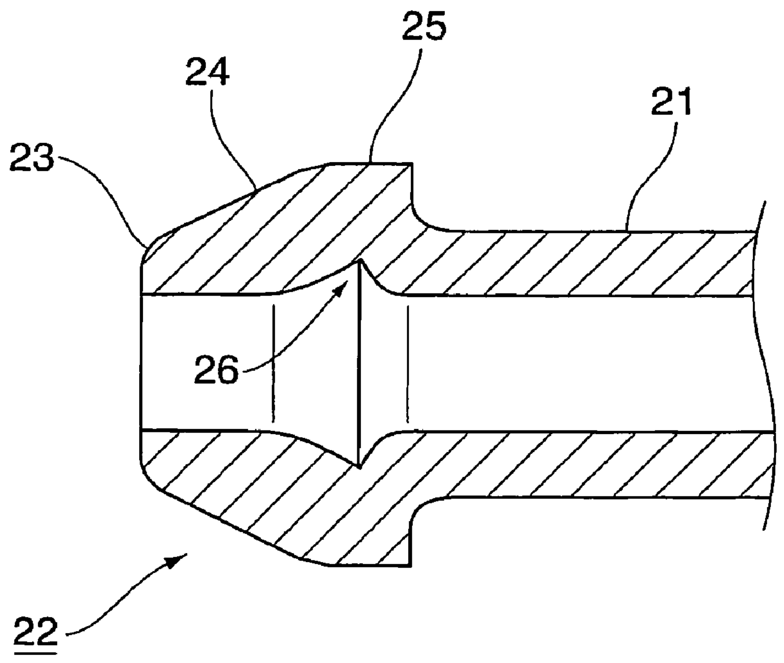
FIG. 7 PRIOR ART
FIG. 7 is a sectional view showing an example of a connection head portion of a high pressure fuel injection tube of a background art constituting an object of the invention.
Figure 8:
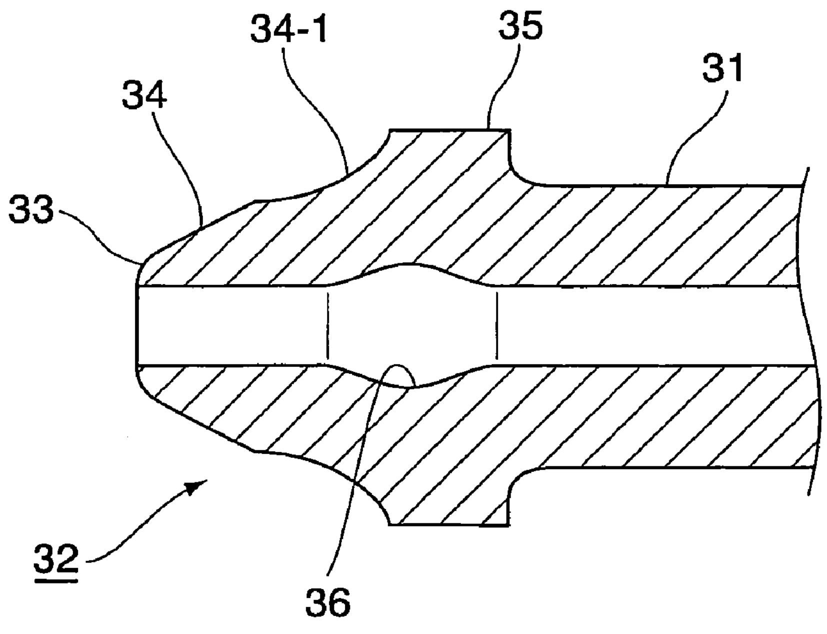
FIG. 8 PRIOR ART
FIG. 8 is a sectional view similarly showing other example of a connection head portion of a high pressure fuel injection tube of a background art.

FIG. 1 is a side view showing an embodiment of a connection head portion of a high pressure fuel injection tube according to the invention, FIG. 2 is a half cut view of a section of FIG. 1, FIGS. 3A and 3B are explanatory views of a section showing a first embodiment of a step of forming the connection head portion of the high pressure fuel injection tube according to the invention, FIGS. 4A and 4B are explanatory views of a section similarly showing a second embodiment of the step of forming the connection head portion of the high pressure fuel injection tube, FIG. 5 is an explanatory view of a section showing a first embodiment of a step of forming an undercut bent recess groove in a ring-like shape having a deep depth and a ring-like recess groove in a contour shape of a section which is provided with a shallow depth and is smooth at the connection head portion of the high pressure fuel injection tube, and FIG. 6 is an explanatory view of a section similarly showing a second embodiment of the step of forming the undercut bent recess groove in the ring-like shape having the deep depth and the ring-like recess groove (pocket) in the contour shape of the section which is provided with the shallow depth and is smooth, numeral 1 designates a thick-walled steel tube, numeral 2 designates a connection head portion, numeral 3 designates a seat face, numeral 4 designates a conical portion, notation 4-1 designates a bent recess groove in a ring-like shape, numeral 5 designates a ring-like flange portion, numeral 6 designates a ring-like recess groove (pocket), numeral 7 designates a chuck, numerals 8, 18 designate punching members, numeral 9 designates a rolling roll member, and numeral 10 designates a swaging die member.

That is, as shown by FIG. 1, FIG. 2, the high pressure fuel injection tube according to the invention includes the connection head portion 2 constituted by the seat face 3, an outer side peripheral face of which is formed into a spherical shape for a counter seat portion, the ring-like flange portion 5 arranged to be formed to be spaced apart from the seat face 3 at an interval therebetween in an axis core direction, the conical portion 4 formed conversingly in a direction of the seat face 3 at the interval region reaching a position of the ring-like flange portion 5 continuously from the seat face 3, and the undercut bent recess groove 4-1 in a ring-like shape having a deep depth at a portion of the conical portion 4 and is provided with the ring-like recess groove (pocket) 6 having a contour shape of a section which is provided with a shallow depth and smooth at an inner peripheral face of an end portion of a steel tube at a connection end portion of the thick-walled steel tube 1 having a comparatively slender diameter (tube diameter of 4 mm through 20 mm, wall thickness of about 1 mm through 8 mm).

In the connection head portion 2, the undercut bent recess groove 4-1 in the ring-like shape having the deep depth provided at a portion of the conical portion 4 is provided on a side of the seat face 3 of the ring-like flange portion 5 of the connection head portion and is characterized in satisfying conditions that W/L=0.3 through 0.75, DA/d=0.95 through 1.3 and a minimum outer diameter DA' of the bent recess groove 4-1 becomes smaller than DA when in a sectional shape of the connection head portion, an end edge on a side of the ring-like flange portion of the bent recess groove 4-1 is defined as point A1, an end edge on an opposed side of the ring-like flange portion is defined as point A2, an outer diameter of the steel tube is designated by notation d, an outer diameter of point A2 is designated by notation DA, a distance in parallel with a tube axis between point A1 and point A2 (width of bent recess groove) is designated by notation W, and a distance between an end face of the seat face. in the spherical shape and point A1 is designated by notation L.

Here, W/L=0.3 through 0.75 as described above because when W/L is less than 0.3, point A2 is excessively proximate to the side of point A1, the width in the axial direction of the ring-like bent recess groove 4-1 is reduced and an effect of shallowing the depth of the inner face of the ring-like recess groove (pocket) 6 is reduced and of reducing the compressive residual stress in the inner surface of the pocket 6, on the other hand, when W/L exceeds 0.75, point A2 becomes excessively proximate to a front end side of the connection head portion, it is difficult to ensure a seal face in contact with a counter metal piece, and a rigidity of a vicinity of a front end of the connection head portion is reduced and the front end is liable to be deformed.

Further, DA/d=0.95 through 1.3 because when DA/d is less than 0.95, point A2 becomes excessively proximate to the front end side of the connection head portion and it is difficult to ensure the seal face in contact with the counter metal piece, on the other hand, when DA/d exceeds 1.3, point A2 becomes excessively proximate to the side of point Al,the width in the axial direction of the ring-like bent recess groove 4-1 is reduced and the effect of shallowing the depth of the inner face of the ring-like recess groove (pocket) 6 is reduced and the effect of reducing the compressive residual stress in the inner surface of the pocket 6.

Further, the minimum outer diameter DA' of the bent recess groove 4-1 becomes smaller than the outer diameter DA of point A2 not only to realize the contour shape of the section which is provided with the shallow depth and smooth at the ring-like recess groove (pocket) 6 on the inner side of the connection head portion but also to make a compressive residual stress which is extremely effective in increasing a fatigue rupture strength exist at the ring-like recess groove (pocket) portion. Here, as a difference between the outer diameter DA of point A2 and the minimum outer diameter DA' of the bent recess groove 4-1, when (DA—DA')/d is adopted as an evaluation index, it is preferable that (DA—DA')/d is about 0.01 through 0.08. The reason is that when (DA—DA')/d is less than 0.01, the effect of shallowing the depth of the inner face of the ring-like recess groove (pocket) 6 of the compressive residual stress in the inner peripheral surface of the pocket is small, on the other hand, when (DA—DA')/d exceeds 0.08, a rigidity of a portion of the bent recess groove 4-1 of the connection head portion and the ring-like recess groove 6 is reduced and the portion is liable to be deformed.

Further, an angle θ of the seat face 3 is not particularly limited and is about 25 degrees to 30 degrees.

Next, a method of forming the connection head portion of the high pressure fuel injection tube according to the invention is constituted by a first forming step of punching to form the connection head portion 2 of the high pressure fuel injection tube from the thick-walled steel tube by the punching members 8, 18 and a second forming step of forming the bent recess groove 4-1 at a portion of the conical portion 4 of the connection head portion 2 formed by the first forming step by the rolling roll member 9 or the swaging die member 10.

First, to explain the first forming step, there are the first embodiment shown in FIGS. 3A and 3B and the second embodiment shown in FIGS. 4A and 4B in the first forming step, according to the first embodiment, as shown by FIGS. 3A and 3B, the connection head portion is formed at the thick-walled steel tube 1 by using the punching member 8. There is used the punching member used in the first embodiment formed with a spherical face 8-1, a conical face 8-2 and a cylindrical portion 8-3 in correspondence respectively with the seat face 3 in the spherical shape, the conical portion 4 and the ring-like flange portion 5 of the connection head portion 2.

In forming the connection head portion according to the first embodiment, as shown by FIGS. 3A and 33, when the front end portion of the steel tube is pressed in the axis core direction by the punching member 8 in a state of holding the thick-walled steel tube 1 by the chuck 7, a portion of the thick-walled steel tube 1 for working the head portion plastically flows, the front end portion of the steel tube is formed with the seat face 3 in the spherical shape, the conical portion 4 continuous to the seat face 3, and the ring-like flange 5 continuous to the conical portion 4 to simultaneously form the connection head portion 2 formed with the ring-like recess groove (pocket) 6 having the contour shape of the section which is provided with the shallow depth and is smooth at the inner peripheral face of the end portion of the steel tube.

Further, according to the second embodiment of the first forming step, as shown by FIGS. 4A and 4B, the connection head portion is formed at the thick-walled steel tube 1 by using the punching member 18. There is used the punching member 18 used in the second embodiment formed with a spherical shape 18-1, a conical face 18-2 and a recess portion 18-3 in a shape of a circular arc in a ring-like shape, and a cylidrical portion 18-4 in correspondence with respectives of the seat face 3 in the spherical shape, the conical portion 4 and a bent projected streak 4*a* in a ring-like shape formed at a portion of the conical portion and the ring-like flange portion 5 of the connection head portion 2.

In forming the connection head portion according to the second embodiment, as shown by FIGS. 4A and 4B, when the end portion of the steel tube is pressed in the axis core direction by the punching member 18 in the state of holding the thick-walled steel tube 1 by the chuck 7, a portion of the thick-walled steel tube 1 for forming the head portion plastically flows, the front end portion of the steel tube is formed with the seat face 3 in the spherical shape, the conical portion 4 continuous to the seat face 3, the bent projected streak 4*a* in the ring-like shape continuous to the conical portion 4 and the ring-like flange 5 continuous to the bent projected streak 4*a* to simultaneously form the ring-like recess groove (pocket) 6 having the contour shape of the section which is provided with the shallow depth and is smooth at the inner peripheral face of the end portion of the steel tube.

Successively, the high pressure fuel injection tube punched to form with the connection head portion 2 at the thick-walled steel tube 1 by the first forming step is subjected to the second forming step, there are two embodiments shown in FIG. 5 and FIG. 6 in the forming step, first, according to the first embodiment shown in FIG. 5, there is used the rolling roll member 9 formed with a bent projected portion 9-1 in correspondence with the bent recess groove 4-1 at a peripheral face thereof, the rolling roll member 9 rotating centering on a rotating axis C is pressed to a portion on a side of the ring-like flange portion 5 of the conical portion 4 of the connection head portion 2 of the high pressure fuel injection tube 1 rotating around the axis core, a portion of the conical portion 4 is undercut, the bent recess groove 4-1 in correspondence with the bent projected portion 9-1 is formed and simultaneously, there is formed the contour shape of a section which is provided with a shallower depth and is smoother than the ring-like recess groove (pocket) 6 formed at an inner peripheral face of the front end portion of the steel tube. Further, by forming of the second stage by the rolling roll member 9, the inner peripheral face of the ring-like recess groove (pocket) 6 is provided with a compressive residual stress. In the case of the roll rolling method, the bent recess groove 4-1 may be formed to be undercut while planetarily rotating the rolling roll member 9 at a surrounding of the high pressure fuel injection tube 1. Although a number of pieces of the rolling roll member 9 is not limited, normally, 2 pieces through 4 pieces thereof are used to arrange at the equal interval.

Further, according to the second embodiment shown in FIG. 6, there is used the swaging die member 10 to arrange at equal interval formed with a bent projected portion 10-1 in correspondence with the bent recess groove 4-1, the bent recess groove 4-1 in correspondence with the bent projected portion 10-1 is formed by undercutting while repeatedly pressing a plurality of the swaging die members 10 to the portion on the side of the ring-like flange 5 of the conical portion 4 of the high pressure fuel injection tube 1 rotating around the axis core and at the same time, there is formed the connection head portion 2 formed with the ring-like recess groove (pocket) 6 having the contour shape of the section which is provided with a shallower depth and is smooth at the inner peripheral face of the front end portion of the steel tube. Further, by the second stage of forming by the swaging die member 10, the inner peripheral face of the ring-like recess groove (pocket) 6 is provided with the compressive residual stress.

In the second embodiment shown in FIG. 6, one may hold the high pressure fuel injection tube 1 and press to rotate the swaging die member 10 when form the bent recess groove 4-1.

In the case of the swaging, in forming while repeatedly pressing the plurality of swaging die members 10, it is preferable to provide relative rotational movement around the tube axis to the high pressure fuel injection tube 1 and the swaging die member 10. Further, the connection head portion 2 can also be formed by calking similar to the swaging method.

Here, to explain briefly a mechanism of generating the compressive residual stress, for example, when a plate member is bent plastically and a load is removed, a portion of the plate member brought into a tensile stress state in bending is brought into a compressive residual stress state after removing the load, conversely, a portion thereof in a compressive stress state in bending is brought into a tensile residual stress state after removing the load. In the second stage of forming of the invention, a tool member having a bent face in a projected shape is used and therefore, the conical portion of the connection head portion is bent, the inner face of the material of the portion is brought into a tensile stress state in the second stage of forming and therefore, the compressive residual stress is generated after removing the load. Further, after generating the compressive residual stress, the connection head portion may be subjected to temper treatment for recovering a toughness.

According to the high pressure fuel injection tube provided by the invention method, a portion of the conical portion 4 is formed with the ring-like bent recess groove 4-1 which is undercut further deeply in the depth, in correspondence with forming the bent recess groove 4-1, the inner peripheral face of the connection head portion 2 is formed with the ring-like recess groove 6 in the contour shape of the section which is provided with a shallower depth and is smoother and therefore, cavitation erosion by the hydraulic pressure bent groove is defined as a point A1, an end edge on an opposed side of the ring-like flange portion is defined as a point A2, an outer diameter of the steel tube is designated by a notation d, an outer diameter of the point A2 is designated by a notation DA, a distance in parallel with a tube axis between the point A1 and the point A2 (a width of the bent recess groove) is designated by a notation W and a distance between an end face of the seat face in the spherical shape and the point A1 is designated by a notation L.

The invention is applicable not only to the high pressure fuel injection tube in the diesel internal combustion engine but also to a high pressure piping used in a supply path or the like of other fuel other than the diesel internal combustion engine.

What is claimed is:

1. A high pressure fuel injection tube which is a high pressure fuel injection tube comprising a connection head portion comprising a seat face in a spherical shape, a ring-like flange portion arranged to be formed to be spaced apart from the seat face at an interval therebetween in an axis core direction, and a conical portion conversingly formed in a direction of the seat face at the interval region reaching a position of the ring-like flange portion continuously from the seat face at a connection end portion of a thick-walled steel tube having a comparatively slender diameter, wherein by providing an undercut bent recess groove in a ring-like shape having a deep depth at a portion of the conical portion, a ring-like recess groove on an inner side of the head portion produced in accordance with forming the connection head portion is formed into a contour shape of a section which is provided with a shallow depth and is smooth and a compressive residual stress is made to be present on an inner peripheral face of the ring-like recess groove portion.

2. The high pressure fuel injection tube according to claim 1, wherein the undercut bent recess groove in the ring-like shape having the deep depth satisfies conditions that W/L=0.3 through 0.75, DA/d=0.95 through 1.3 and a minimum outer diameter of the bent recess groove becomes smaller than DA when an end edge on a side of the ring-like flange portion of the bent groove is defined as a point A1, an end edge on an opposed side of the ring-like flange portion is defined as a point A2, an outer diameter of the steel tube is designated by a notation d, an outer diameter of the point A2 is designated by a notation DA, a distance in parallel with a tube axis between the point A1 and the point A2 (a width of the bent recess groove 0 is designated by a notation W and a distance between an end face of the seat face in the spherical shape and the point A1 is designated by a notation L.

3. A method of forming a high pressure fuel injection tube comprising: forming, on a connection end portion of a thick-walled steel tube having a comparatively slender diameter, a seat face in a spherical shape, and a ring-like flange portion arranged to be formed to be spaced apart from the seat face at an interval therebetween in an axis core direction, and at the interval region reaching a position of the ring-like flange portion continuously from the seat face, a conical portion formed conversingly in a direction of the seat face, and then forming, on a portion of the conical portion, an undercut bent recess groove in a ring-like shape having a deep depth.

4. A method of forming a high pressure fuel injection tube comprising: forming, on a connection end portion of a thick-wall seal tube having a comparatively small diameter, a seat face in a spherical shape, and a ring-like flange portion arranged to be formed to be spaced apart from the seat face at an interval therebetween in an axis core direction, and at the interval region reaching a position of the ring-like flange portion continuously from the seat face, a conical portion formed conversingly in a direction of the seat face at and then forming on a portion of the conical portion, a ring-like recess groove having a shallow depth and thereafter forming the groove to an undercut bent recess groove in a ring-like shape having a deep depth.

5. The method of forming a high pressure fuel injection tube according to claim 4, wherein as a method of forming the undercut bent recess groove in the ring-like shape having the deep depth at the portion of the conical portion, there is used a method of forming the ring-like bent recess groove by rolling by a roller or by swaging by a plurality of pressing pieces each having a bent projected face in a shape of a circular arc.

6. The method of forming a high pressure fuel injection tube according to claim 4, wherein as a method of forming the undercut bent recess groove in the ring-like shape having the deep depth at the portion of the conical portion, there is used a method of forming a bent projected streak in a ringlike shape at the portion of the conical portion in forming the conical portion, successively, forming the bent projected streak by rolling by a roller or swaging by a plurality of pressing pieces each having a bent projected face in a shape of a circular arc.

7. The method of forming a high pressure fuel injection tube according to claim 3, wherein as a method of forming the undercut bent recess groove in the ring-like shape having the deep depth at the portion of the conical portion, there is used a method of forming the ring-like bent recess groove by rolling by a roller or by swaging by a plurality of pressing pieces each having a bent projected face in a shape of a circular arc.

8. The method of forming a high pressure fuel injection tube according to claim 3, wherein as a method of forming the undercut bent recess groove in the ring-like shape having the deep depth at the portion of the conical portion, there is used a method of forming a bent projected streak in a ring-like shape at the portion of the conical portion in forming the conical portion, successively, forming the bent projected streak by rolling by a roller or swaging by a plurality of pressing pieces each having a bent projected face in a shape of a circular arc.

* * * * *